United States Patent [19]

Jackson

[11] Patent Number: 5,005,879
[45] Date of Patent: Apr. 9, 1991

[54] CORNER BRACKET AND INTERCONNECTION SYSTEM FOR DUCTING

[75] Inventor: Roy J. Jackson, New South Wales, Australia

[73] Assignee: Bullock Mfg. Pty. Limited, New South Wales, Australia

[21] Appl. No.: 389,533

[22] Filed: Aug. 4, 1989

[30] Foreign Application Priority Data

Aug. 4, 1988 [AU] Australia .................... PI9657

[51] Int. Cl.⁵ .............................. F16L 23/00
[52] U.S. Cl. .................... 285/405; 285/424; 29/513
[58] Field of Search ........... 285/330, 363, 382, 382.1, 285/405, 406, 424, 364; 29/513; 403/382, 205, 401–403

[56] References Cited

U.S. PATENT DOCUMENTS

| | | |
|---|---|---|
| 605,263 | 6/1898 | Tharp . |
| 913,685 | 3/1909 | Boyd . |
| 1,209,032 | 12/1916 | Richens . |
| 1,451,887 | 4/1923 | Novak . |
| 2,066,475 | 1/1937 | Kramig et al. ............ 29/513 |
| 2,396,030 | 3/1946 | Terry . |
| 2,625,723 | 1/1953 | Bassett ................... 29/513 |
| 2,785,035 | 3/1957 | Hammer ............ 403/403 X |
| 2,869,694 | 1/1959 | Breckheimer . |
| 2,916,054 | 12/1959 | Callan . |
| 3,001,805 | 9/1961 | Jones et al. . |
| 3,347,569 | 10/1967 | Lindgren ............ 285/424 X |
| 3,443,601 | 5/1969 | Siegwart . |
| 3,500,264 | 3/1970 | Floyd . |
| 3,712,649 | 1/1973 | Martin ................. 285/397 |
| 3,712,650 | 1/1973 | Mez ..................... 285/405 |
| 3,824,639 | 7/1974 | Mandusky ......... 403/403 X |
| 4,068,967 | 1/1978 | Hoodis ................. 403/402 |
| 4,218,079 | 8/1980 | Arnoldt ................ 285/331 |
| 4,288,115 | 9/1981 | Sullivan ................ 285/363 |
| 4,466,641 | 8/1984 | Heilman et al. ...... 285/424 X |
| 4,508,376 | 4/1985 | Arnoldt ................ 285/363 |
| 4,509,778 | 4/1985 | Arnoldt ................ 285/406 |
| 4,542,923 | 9/1985 | La Crosse et al. ....... 285/424 |
| 4,558,892 | 12/1985 | Daw et al. .......... 285/424 X |
| 4,564,227 | 1/1986 | Murck .................. 285/364 |
| 4,584,756 | 4/1986 | Arnoldt ................ 29/526 R |
| 4,621,661 | 11/1986 | Greiner ................ 138/172 |

Primary Examiner—Dave W. Arola
Assistant Examiner—Jeffrey L. Thompson
Attorney, Agent, or Firm—Ladas & Parry

[57] ABSTRACT

A corner bracket 20, 120 forming part of a system of corner brackets adapted for mechanically inter-connecting in an air tight manner generally rectangular duct portions 37, 38. A first bracket 12 on the end of a first duct 37 is placed in adjacent, abutting, back to back relationship with a second bracket 6 on a second duct 38 and similarly at all four corners of the duct ends. Tabs 27, 127 which are formed from the corner bracket 20, 120 are located so as to be foldable over the adjacent, back to back brackets so as to mechanically bind the brackets together. The folding operation can be performed with hand tools such as hammers and the like. Using appropriate seals, an air tight, mechanically sound duct joint is accomplished. The brackets and the bracket inter-connection system are particularly suited for use with air conditioning duct networks.

19 Claims, 5 Drawing Sheets

CORNER BRACKET AND INTERCONNECTION SYSTEM FOR DUCTING

The present invention relates to a corner bracket constructed so as to allow back to back interconnection of the bracket to similar brackets. The brackets are particularly suited for use with flange jointing arrangements for air conditioning duct and the like.

PRIOR ART

In the art of air conditioning duct jointing there are a number of prior art systems in use. Referring to FIG. 1 all of the prior art systems have in common the application of flange kits to abutting ends of air conditioning duct to be joined. The kit for each end typically comprises flange pieces 1, 2, 3, 4 together with corner brackets 5, 6, 7, 8. These flange kits are typically attached to the duct ends either in the factory or on site. The flanges can also be roll formed directly onto the ends of the ducts, usually in the factory. The legs of the corner brackets are adapted to be received within ends of the flanges.

On site the ducting complete with flange assemblies attached is lifted into its final installation location, the opposed flange assemblies of duct ends to be abutted are placed face to face with sealent material trapped between and a series of fasteners is then used to permanently mate the flanges of the abutted duct ends. Mating fasteners used to date include bolts passing through facing corner brackets and clips which are slid over and bind the abutting flange pieces and/or corner brackets.

A selection of the possibly most relevant prior art includes U.S. Pat. No. 3,443,601 (Siegwart), U.S. Pat. No. 3,712,650 (Mez), U.S. Pat. No. 4,218,079 Arnoldt, U.S. Pat. No. 4,466,641 (Heilman) and U.S. Pat. No. 4,509,778 (Arnoldt). During the prosecution of that prior art many other documents relating to air conditioning duct joints were cited. In general terms this prior art concerns itself with methods of attaching flanges to the ends of air conditioning duct (or integrally forming flanges as part of the ends of air conditioning ducts) so as to allow for an air tight, long lived joint between abutting duct sections. Of course the flange and seal construction is only one contributor to a reliable air tight duct joint. The other important contributor is the means by which adjacent, abutting flanges are bound together to form the joint. The prior art discloses a combination of overlapping clips as one primary means by which the binding means is effected. The prior art also reveals that a system of corner brackets has evolved, which brackets are applied to duct corners in slotted mechanical inter-connection with the flange of which the corner bracket becomes a part. Adjacent, abutting corner brackets of adjacent, abutting duct ends are themselves bound together in a mechanically sealed manner. The primary binding method for binding these corner brackets has involved the use of threaded fasteners such as nut and bolt assemblies passing through aligned holes in the very corners of adjacent, abutting corner brackets. FIG. 2 of U.S. Pat. No. 4,509,778 (Arnoldt) clearly shows the aligned holes of adjacent, abutting corner brackets. FIG. 11 of U.S. Pat. No. 4,218,079 (Arnoldt) clearly shows a cross section through bolted corner brackets.

The prior art has not relied solely upon bolting as a means of binding corner brackets—for example the above refered FIG. 2 of U.S. Pat. No. 4,509,778 shows a clip which slides over and binds adjacent, abutting legs of adjacent, abutting corner brackets. However, in all cases known to the applicant, the binding operation and binding means for adjacent corner brackets has required the use of a component or components mechanically separate from either of the brackets being bound. The typical prior art bound corner bracket assembly has required four separate components—the two brackets and two clips or two brackets and one nut and one bolt.

Disadvantages of these prior art corner bracket mating systems include:

accurate aligning of mating corner brackets is critical to allow bolts to be threaded therethrough the fastener component(s) is/are an entirely separate article which must be transported to the final installation location and installed as an entirely separate item.

It is an object of the present invention to provide corner brackets for duct flange systems and a method of installation of corner brackets for such flange systems which does away with the requirement for an entirely separate fastener for the corner brackets.

It is a further object of the invention to provide a corner bracket binding system which will tolerate some missalignment, at least in the plane of the mating faces of abutting brackets.

It is a further object of the present invention to provide a corner bracket which achieves one or more of the above mentioned objects and otherwise overcomes one or more of the above mentioned problems of the prior art and which will be useable with many, if not all, of the duct flange arrangements presently used in the air conditioning market.

BRIEF DESCRIPTION OF THE INVENTION

In one broad form there is provided a system for joining two like ends of air conditioning ducts of substantially rectangular cross-section, each end having four coplanar partial flange members, said system comprising eight L-shaped corner brackets arranged two for each corner of said duct, each said corner bracket comprising first and second legs which are substantially co-planar and perpendicular, a corner region being defined at an area of intersection of said legs and having an elongated bendable tab joined at one end to said bracket, and generally aligned with one of said legs; wherein each corner of the duct joint is secured by an abutting pair of said corner brackets arranged with the first leg of each bracket lying alongside the second leg of the other bracket, said bracket clamping said partial flange members and each said tab being bent away from the corresponding one leg and over the corner region of both brackets to maintain the clamping action.

An L-shaped corner bracket for use in the above-described system, said corner bracket comprising first and second legs which are substantially co-planar and perpendicular, a corner region being defined at the intersection of said legs and having an elongate bendable tab joined at one end to said bracket and aligned with one of said legs.

In a further broad form there is provided, in an air conditioning duct jointing system including flange kits mounted on or forming an integral part of respective ends of air conditioning duct to be abutted and subsequently joined, a corner bracket adapted for application to each corner of an end of an air conditioning duct to be joined; said corner bracket comprising first and second legs connected at right angles to each other, a corner region thereby being defined at the area of intersection of the first and second legs; said first and second legs lying in a common plane; in said corner region being located a tab area whose longitudinal centre line is aligned with the longitudinal centre line of said first leg, said tab area forming a bendable connecting tab when all sides defining the tab area save one are separated from said corner region.

Preferably the side of the tab area left connected is that side closest to the adjacent outer rim of said second leg.

Preferably said tab is waisted (as defined later in the specification).

Preferably said tab is of sufficient length to allow it to be bent so as to be bent around and thereby clamp at least an adjacent edge of an abutting second corner bracket.

In a further broad form there is provided a system of interconnecting abutting first and second corner brackets; each said bracket comprising first and second legs connected at a common end at right angles to each other whereby a corner region is defined at the area of the intersection of said first and second legs; said first and second legs lying in a common plane; in said corner region being located a tab area whose centre line is aligned with the centre line of said first leg; said tab area forming a bendable connecting tab when all sides defining the tab area save one are separated from said corner region, said first and second brackets being aligned in abuttment such that said first leg of said first bracket lies against said second leg of said second bracket whilst, at the same time, said second leg of said first bracket lies against said first leg of said second bracket; said first and second brackets being mechanically interconnected by the steps of:

(a) bending the tab of said first bracket around the immediately adjacent outer rim of said second leg of said first bracket and thence around the immediately adjacent outer rim of said first leg of said second bracket;

(b) bending the tab of said second bracket around the immediately adjacent outer rim of said second leg of said second bracket and thence around the immediately adjacent outer rim of said first leg of said first bracket.

Preferably the legs of each bracket are flat strips turned at the edges to provide stiffening ribs, said ribs also acting to provide purchase for said tabs when said tabs are folded over said ribs.

In yet a further broad form said system of interconnected brackets is applied to cause abutted ends of generally square or rectangular cross section duct to be connected in permanently and firmly air sealed abutted relationship.

the tabs of interconnected brackets thereby acting against not just the bracket against which they immediately abut, but also with all other abutted corner brackets thereby providing a composite, rigid duct interconnection.

BRIEF DESCRIPTION OF THE DRAWINGS

One embodiment of the invention will now be described with reference to the drawings wherein.

DESCRIPTION OF THE PREFERRED EMBODIMENTS

Primarily, two embodiments of corner brackets for duct inter-connection are described below. The important features of both embodiments include the integral tabs formed in corner regions of the corner brackets and the integral, aligned bolt holes which result automatically from use of the tabs for the purposes of binding adjacent, abutting brackets together. These are the primary common features of the two embodiments but these should not be construed as being the only common or meritorious features.

DETAILED DESCRIPTION OF A FIRST EMBODIMENT

Figure 2A:
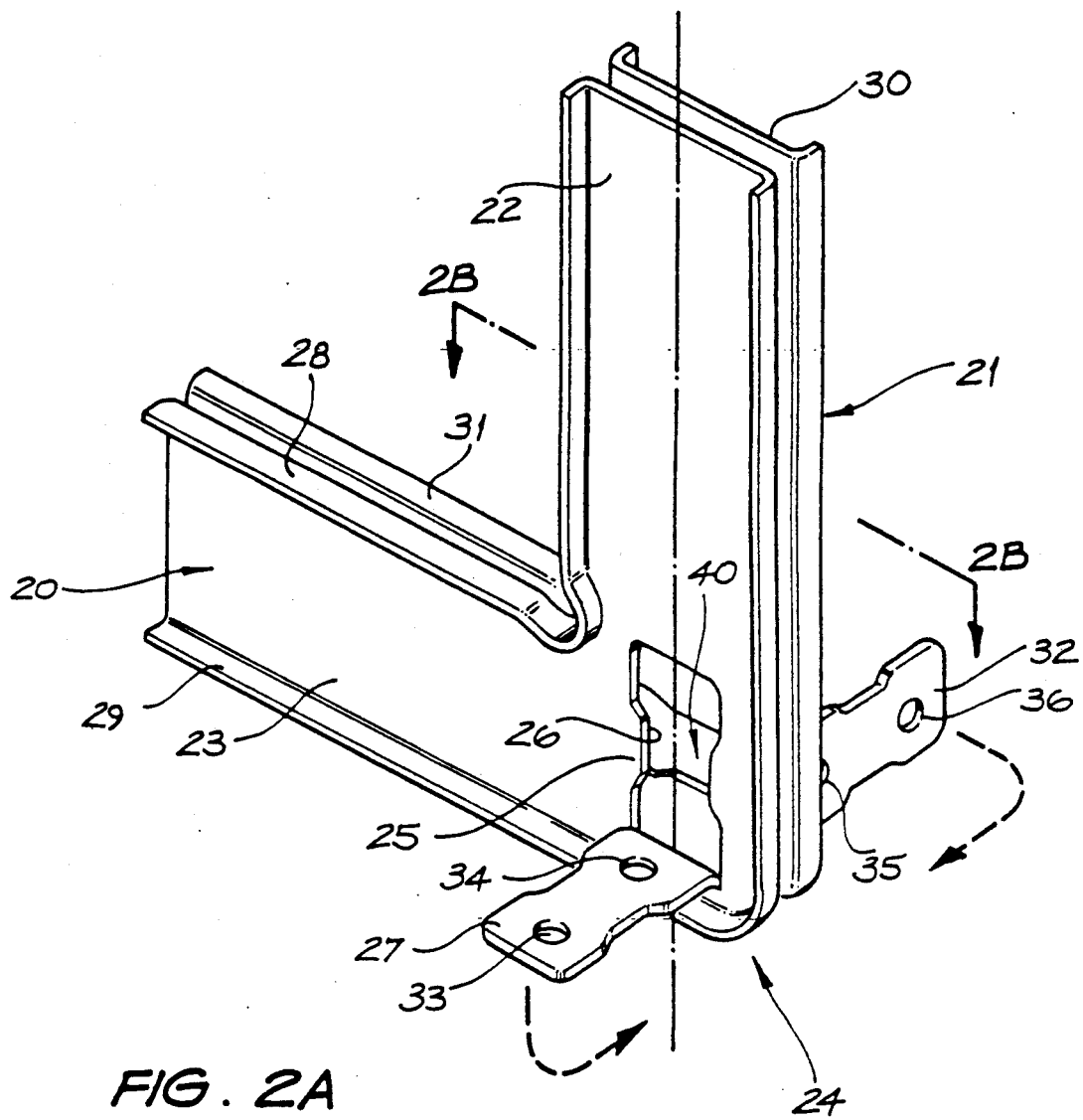
FIG. 2A shows two corner brackets according to a first embodiment in abutting relationship and FIG. 2B shows a section through two abutting corner brackets of a first embodiment mechanically interconnected by their tabs

Two brackets 20, 21 of the first embodiment are shown abutting in FIG. 2A. The closest bracket 20 comprises a first leg 22 and a second leg 23 joined at right angles at a corner region 24. Within the corner region is a "tab area" 25 which, in this case, is generally rectangular in shape but nipped in at a waist region 26. The tab area 25 is aligned such that its longitudinal centre line is aligned with the longitudinal centre line of the first leg 22.

In FIG. 2A a tab 27 has been punched from the tab area 25 and bent as illustrated in FIG. 2A so as to lie along the duct work face when the bracket 20 is applied to an edge of the duct work.

The first and second legs of the bracket 20 are themselves punched from a single metal plate and have edge portions 28. 29 turned at right angles so as to provide strengthening ribs for the bracket and also to provide appropriate width for wedging purposes when inserted within receiving flange members (not shown).

Additional wedging width can be provided if necessary by punching flared holes in the legs—the flares providing the desired interference fit within the flange members.

The opposed bracket 21 also shown in FIG. 2A is identical in shape and construction to bracket 20. The brackets 20. 21 are shown abutted in such a way that the first leg 22 of bracket 20 lies against the corresponding second leg 30 of bracket 21 whilst the second leg 23 of bracket 20 lies against the first leg 31 of bracket 21.

Note that in all cases in the first embodiment the "first leg" is that leg which has the longitudinal centre line of the tab area 25 aligned with the leg centre line. (See the discussion in the second embodiment where the tab area is differently aligned.)

When the brackets 20, 21 are abutted in this fashion the tab 32 of the second bracket 21 is found to inherently and automatically lie along the same longitudinal direction as the tab 27 of the first bracket 20 but rotated 90° about the longitudinal centre line axis relative to the tab 27.

In this embodiment the brackets are punched from galvanized steel plate of 1 to 3 mm thickness. The preferred thickness range for most purposes is 1.5–2.5 mm.

In one form a right angle rib is provided as shown (29) in FIG. 2A for brackets of thickness 1.5–2 mm.

In an alternative form a softer angled rib is provided for brackets of thickness 2.5–3 mm.

In yet another alternative form no rib is provided when the bracket is made from plate of 3 mm thickness or larger.

Usually the bracket leg extension is around 75 mm for the thickness ranges given above. Specifically the brackets (all identical) are punched from the steel plate, the edge ribbing effected and the tab punched from the corner area. In some circumstances holes 33, 34, 35. 36 are drilled in the tab area (or punched) to facilitate the bending of the tabs during corner mating on site.

The above manufacturing steps are carried out by the one die punch operation on 150 mm wide steel plate stock. State of the art punching machinery can punch 3000 brackets per hour per die.

Figure 1:
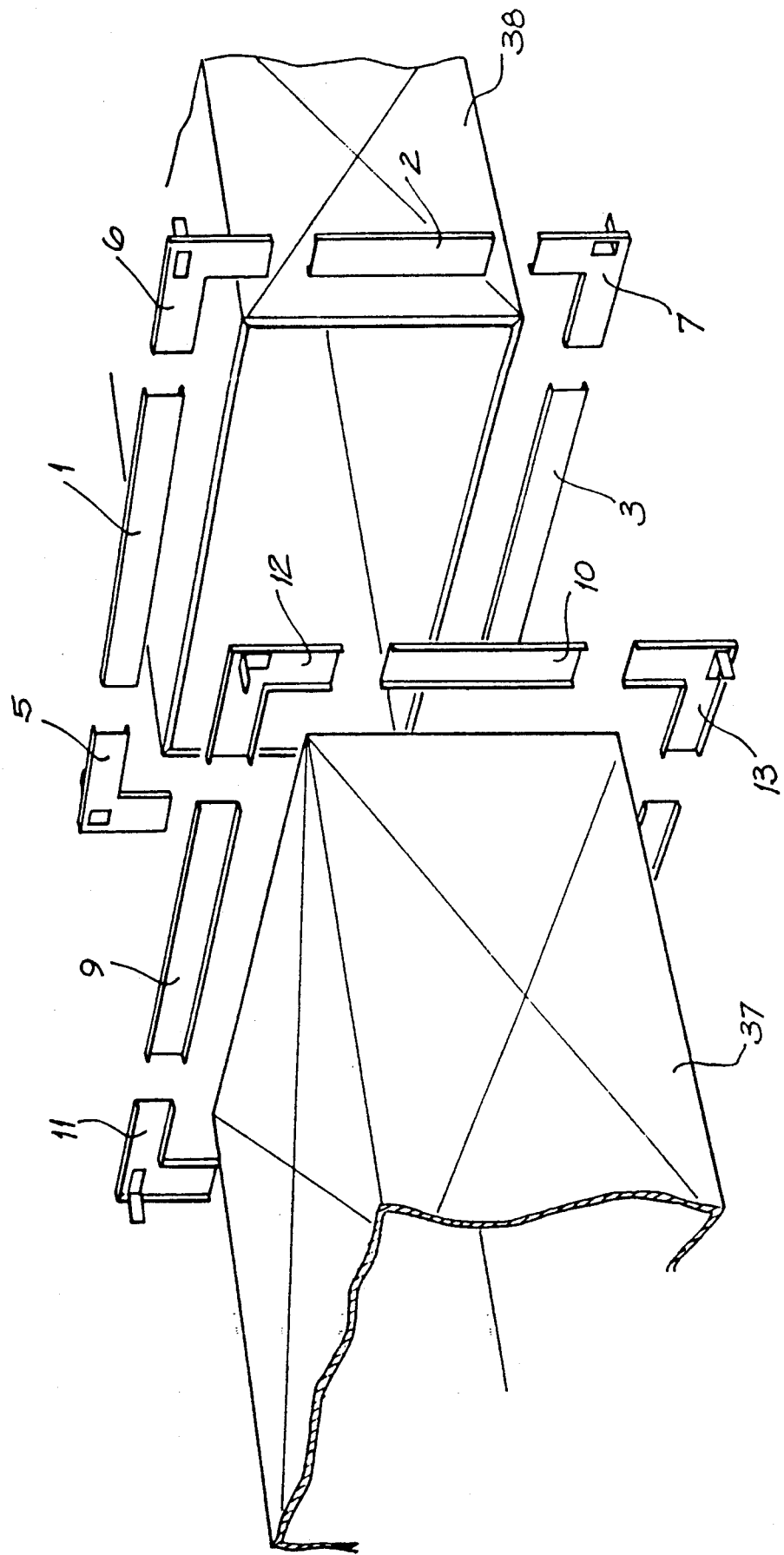
FIG. 1 shows a general arrangement of duct flanges and duct interconnection applicable both to the prior art and to the present invention, (corner brackets illustrated are according to the invention; flanges are prior art)

Specifically, in use for the purposes of providing flanges for abutting ends of air conditioning duct work and their interconnection, the installation process is as follows:

Referring initially to FIG. 1 air conditioning duct portions 27 and 38 are manufactured in a factory. Flange assemblies as generally shown applied to the edge of duct 38 are preferably applied at the factory (although this can be done on site if necessary) . The flange assemblies comprise flange members 1, 2, 3, 4 which are affixed to the respective edge faces of the duct 38 or roll formed on the duct and are also interconnected by corner brackets 5, 6 , 7, 8. The flange members are supplied by a number of manufacturers including DUCTMATE INDUSTRIES INC (of USA) and EXANNO PRODUCTS LIMITED (of Canada). The flange members are described in many prior art patents including U.S. Pat. Nos. 3,443,601, 4,466,641, 3,712,650 and 4,509,778.

The corner brackets 5, 6, 7, 8 are shaped according to the first embodiment just described. The corner brackets are applied such that the tab (27 of bracket 20) lies along the air conditioning duct work away from the duct work face to which the corner bracket is applied. (Again note that the alignment of the second embodiment tab is different to this.) The duct work complete with flange assemblies attached is transported to site, lifted into final position and abutting faces of the ducts 37, 38 brought into abutting relationship so that corner brackets 12 and 6 and corner brackets 13 and 7 form back to back pairs similar to the pair 20, 12 shown in FIG. 2A.

Figure 2B:
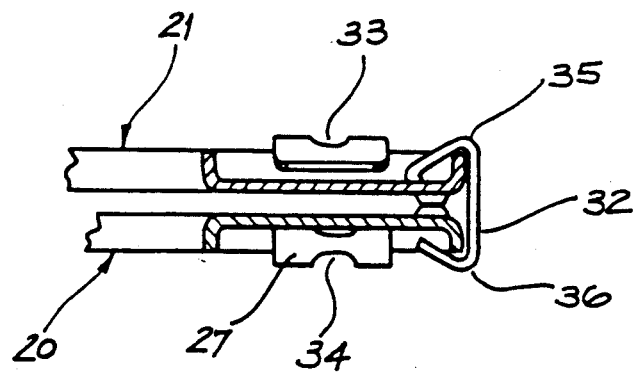

The corner brackets (and thereby the whole of the abutting flanges) are permanently attached to each other simply by the installation worker bending the tabs 27, 32 around the outer edge of the corner area of each corner bracket as generally shown in FIG. 2A so that the tabs clamp against at least the turned edge portion 29. 39 of respective abutting brackets 20, 21. The completed arrangement is as generally shown in FIG. 2B. The bent tabs hold the abutting corner brackets in a locked, non sliding relationship.

The fact that the four corner brackets on the end of each duct are themselves held in a fixed relation by virtue of their attachment to the duct creates the condition that the tabs interact with and bind not just the facing bracket to which they are immediately connected but also all the other corner brackets of the abutted assemblies of the duct to duct joint. The result is a very rigid, reliable duct connection which is capable of maintaining adequate pressure on sealing material placed between the mating flange and mating corner bracket surfaces at the connection so that an adequate air pressure seal is provided.

Further, once the tabs are in the bent, interlocked position a substantially square bolt hole is left in the corner area of the bracket assembly. the left and right sides of the bolt hole being formed by the waist 26 of the tab area 25 of bracket 20 whilst the top and bottom sides of the bolt hole 40 are formed by the waist of the tab area of bracket 21. This bolt hole can be used for the attachment of the corner bracket assembly to suspension systems or it can be used to accommodate bolts for the holding of auxiliary equipment to the duct work.

In isolated special cases where site conditions dictate that tabs are not accessible for bending, the brackets can be bolted together using the bolt holes.

Advantages of the above described first embodiment assembly include:

Only one universal bracket need be produced.

The bracket, by having integral fasteners, saves on total material as compared to equivalent prior art fastened bracket assemblies (typically, today, corner brackets joints using bolts require four bolts per duct joint at U.S. 15 cents per bolt and 2–3 man minutes per joint. It is conservatively estimated that by not requiring separate bolts or other separate fasteners and by also needing less time for installation due to the fastening tabs of the first embodiment already being in position for the tradesman to work on some 120–200 million U.S. dollars can be saved on air conditioning duct work installation in industrialized countries per year.

A hole is automatically provided in the abutted corner brackets, which hole is free for use to support the duct work or to attach auxiliary equipment. The hole is not required for fasteners to hold the corner brackets together.

DETAILED DESCRIPTION OF A SECOND EMBODIMENT

With reference to FIGS. 3, 4, 5, 6, 7 and 8 a second embodiment of the corner bracket of the invention will now be described.

Figure 6:
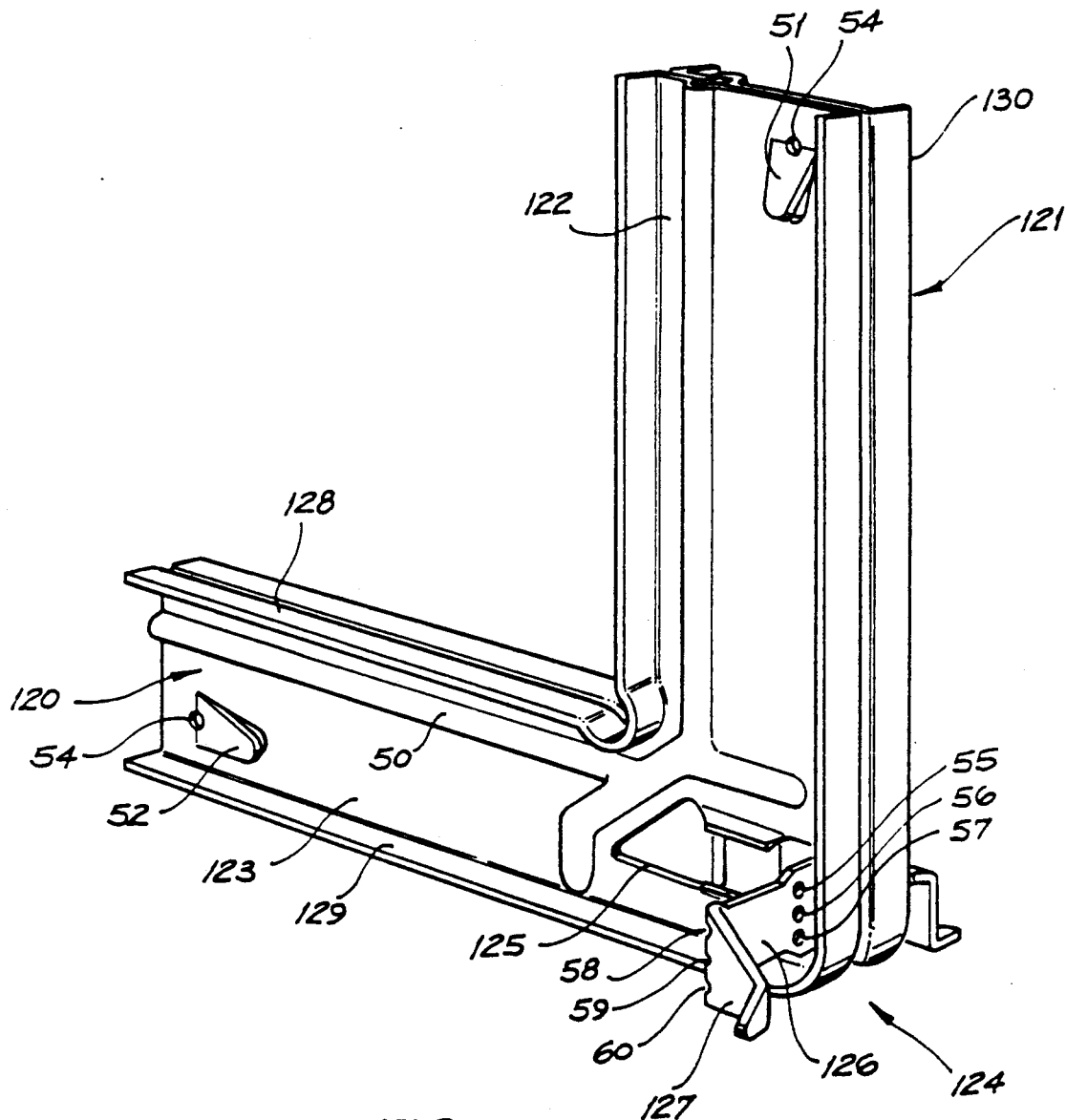
FIG. 6 shows two brackets of the second embodiment in adjacent, abutting relationship as they would be in use as part of a flange joint with the tab binding members bent partly towards the bound position.

In the following description components of the bracket of the second embodiment which generally correspond with components of the bracket of the first embodiment have been given the same identifying number but preceded by a 1. e.g. tab 27 in FIG. 2A becomes tab 127 in FIG. 6. Note, of course, that the structure of tab 27 and the structure of tab 127 is not identical. Referring to FIG. 6 (of the second embodiment) and comparing it generally with FIG. 2A (of the first embodiment) there is shown two brackets 120. 121 in adjacent, abutting relationship. The closest bracket 120 comprises a first leg 122 and a second leg 123 joined at right angles at a corner region 124. Within the corner region 124 is a "tab area" 125 which, in very broad terms, is generally rectangularly shaped (although having an offset, triangular shape at its end closest to the second leg 123). The tab area 125 is aligned so that its longitudinal centre line is aligned with the longitudinal centre line of the second leg 123.

In FIG. 6 a tab 127 has been punched from the tab area 125 and bent as illustrated in FIG. 6 so as to lie generally parallel to the duct work face to which the first leg 122 is attached when the bracket 120 is applied to the flanges of the duct work, (i.e. the tab 127 is bent so as to lie parallel with the duct face aligned with the corner leg [first leg 122 n this case] as compared with the leg [second leg 123 in this case] along whose centre line the tab area [125 in this case] is aligned.)

The first and second legs of the bracket 120 are themselves punched from a single metal plate and have edge portions 128, 129 turned at right angles to the general plane of the first leg 122 and second leg 123 so as to provide strengthening ribs for the leg and for the bracket and also to provide appropriate width for wedging purposes when inserted within receiving flange members (not shown, but see generally FIG. 1 and the prior art specifications mentioned at the beginning of the specification).

Figure 3:
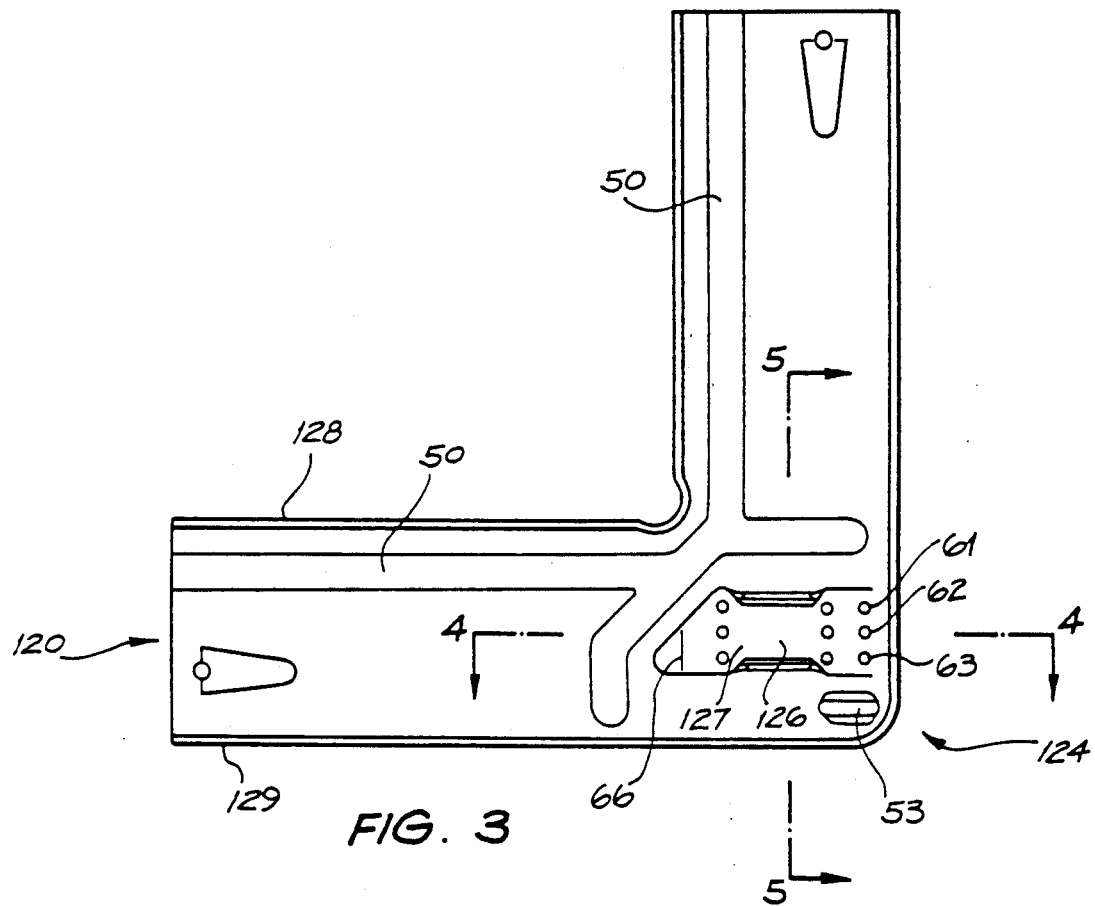
FIG. 3 shows a side view of a bracket of a second embodiment bracket.
Figure 4:
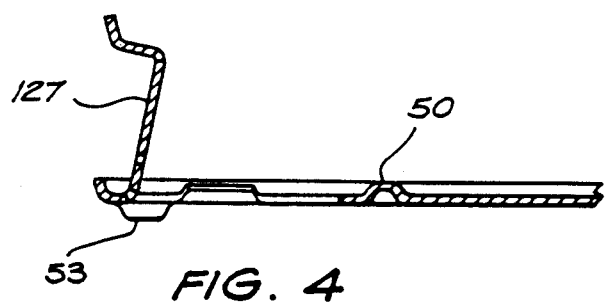
FIG. 4 shows a section through the second embodiment of FIG. 3 with the tab lifted.
Figure 5:
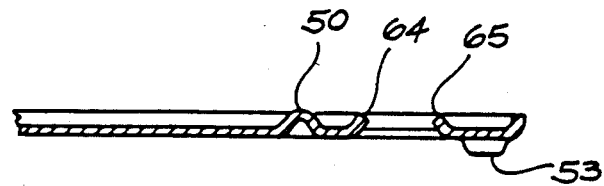
FIG. 5 shows a further section view through the third embodiment of FIG. 3.

An additional unitary reinforcing rib assembly comprising raised (approximately 2 mm) channels is punched in the bracket 120 as seen in better detail and cross section in FIGS. 3, 4 and 5.

The opposed bracket 121, also shown in FIG. 6, is identical in shape and construction to the bracket 120. The brackets 120, 121 are shown in adjacent, abutted relationship such that the first leg 122 of bracket 120 lies against second leg 130 of bracket 121 whilst the second leg 123 of bracket 120 lies against the first leg 131 of bracket 121.

In this second embodiment it is the "second leg" of the corner bracket which has the tab area aligned with the leg centre line. This contrasts with the first embodiment wherein the tab area is aligned with the centre line of what was defined as the "first leg". The functional effect, in the end, is the same for both the first and second embodiments but it should be noted that the first embodiment as shown in FIG. 2A shows one of two alternatives for tab area alignment whilst the second embodiment, as best illustrated in corresponding FIG. 6, shows the second of the alternative tab area alignments. Most importantly it is necessary for identical brackets to be mated (i.e. placed in adJacent abutting relationship) with identical brackets. Therefore a bracket of the first embodiment could not be mated with a bracket of the second embodiment for the purposes of carrying out the invention described in this specification. On the other hand, of course, this emphasises one of the advantages of embodiments of the present invention: namely that identical brackets mated together provide the "double tab" when the tabs are bent back around both the bracket to which they are attached and their adjacent, abutted bracket.

Bar holding tabs 51, 52 are punched near the extreme ends of the legs 122. 123 as generally shown in FIG. 3 and FIG. 6. The tabs 51. 52 can be raised and bent so as to hold reinforcing bars and the like when site conditions dictate it (i.e. when extra large ducting requires reinforcement).

A dimple 53 in the very corner of the corner region 124 is raised proud on the face of the corner bracket 120 opposite to the face in view in FIG. 3. This face is the "mating" face which will be abutted against an adjacent, abutting corner bracket (121 in FIG. 6). The purpose of the dimple 53 is to bear against the opposing dimple of the adjacent, abutting corner bracket so that the mated corner bracket pair have sufficient width that they will remain wedged within the duct flanges into which the legs of the pair are inserted in use. (FIG. 2B of the first embodiment shows the dimples [un-numbered] bearing against each other.)

In the second embodiment holes of approximately 2 to 2.5 mm diameter perforate the bracket 120 as illustrated, for example, in FIG. 6, so as to facilitate bending of the tabs punched therein. In particular perforation hole 54 facilitates the bending of the bar holding tab 52 and the aligned perforations 55, 56, 57 and 58, 59, 60 define fold lines (and facilitate the bending about those fold lines) on tab 127. In addition there is a further series of three aligned perforations 61. 62, 63 (refer FIG. 3) which facilitate bending about a further fold line located at the base of the tab 127.

Considering the tab 127 in more detail, referring firstly to FIG. 3, the tab outline is punched in the corner region 124 so that three of the tab's sides are separated from the surrounding corner region. These sides are nipped to form a waist region 126 as shown in FIG. 3 As part of the same punching operation that part of the corner region 124 adjacent the waist region 126 of the tab 127 is flared upwardly in the same direction as the ribs 128, 129. Two angled ribs 64. 65 are thereby formed which, on the one hand, provide additional reinforcement to the bracket as a whole and also serve to thicken what will become two edges of a four edged bolt hole when like brackets are placed back to back and mechanically bound by the tab 127 as to be described hereunder.

That portion of the tab 127 furthest away from its connection to the corner region 124 has an offset, triangular shape as generally shown in FIG. 3. Near the apex of the right triangular region a score line 66 generally parallel to the other fold lines (defined by the perforations previously mention) is made for the purposes of facilitating bending of the apex region in an opposite direction to the direction of the folds made about the fold lines. The section of FIG. 4 shows the tab 127 in a partly bent, elevated state, being bent approximately 90° about the fold line defined by the perforations 61, 62, 63 and being further bent by a further 90° about the fold line defined by the perforations 58, 59, 60 and finally being bent approximately 45° in the opposite direction about the score line 66.

The second embodiment as illustrated in FIG. 3 is drawn full size. And is made from galvanised steel approximately 1.5 mm thick (16 gauge). The sections of FIG. 4 and FIG. 5 have been enlarged very slightly for clarity.

For this embodiment the thickness of the metal from which the bracket is constructed can be varied dependent upon the size of the ducting to be connected. It is unlikely that the thickness will vary outside the range 1.5-2.5 mm (16-12 gauge). It is highly unlikely that the thickness will need to range outside of 1.2-3 mm (18-10 gauge). For very thick metal (e.g. 12 gauge) it may be necessary to actually cut partially along the proposed fold lines in order to allow sharp bends to be made on site with hand tools.

The manufacturing process for the brackets of the second embodiment is the same as that for the first embodiment.

Figure 7:
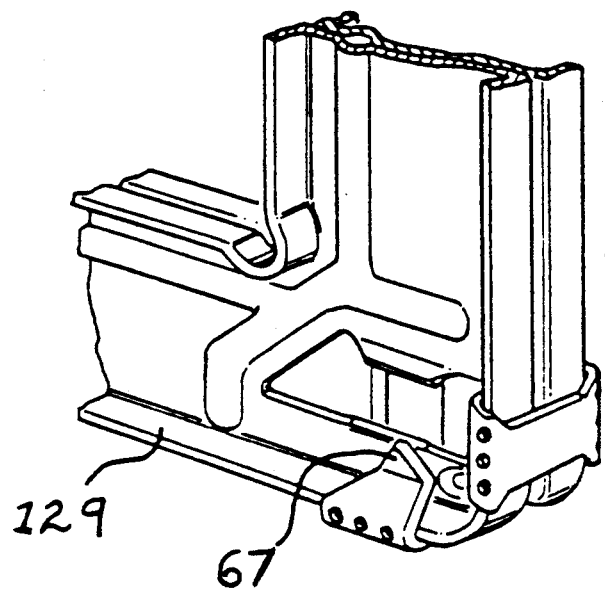
FIG. 7 shows further detail of the adjacent abutting third embodiment brackets of FIG. 6 with the tab members of both brackets bent entirely over so as to mechanically bind both brackets together and FIG. 8 shows a nut and bolt assembly applied to the aligned hole formed in the corners of the adjacent, abutting brackets of FIGS. 6 and 7.

In use the brackets are assembled to the flanges on duct ends at the factory. The tabs are partially bent to the configuration shown in section in FIG. 4. The ducts are then taken to site for installation. With the ducts supported in their final instalation position with flange and corner bracket assemblies in adjacent, abutting relationship (refer FIG. 1) tabs of adjacent corner brackets are bent over both the outer rim of their own bracket and the outer rim of the bracket against which they abut. The brackets in abutting, adjacent relation ready for tab bending are shown in FIG. 6. Adjacent brackets with tabs completely bent over are shown in FIG. 7. The bending operation can be carried out by a worker using a hand tool such as a hammer or the like. The apex portion 67 of the tab bent about the score line 66 facilitates the closing down of the bent tab assembly neatly against the inside rim area of the bracket rim 129. The perforations along the fold lines facilitate bending using simple hand held tools but do not detract significantly from the strength of the resulting mechanical joint binding the adjacent, abutting corner brackets together. A seal (not shown) made from butyl mastic or the like is applied between the abutting faces of the flanges and corner brackets so as to be clamped therebetween when the corner bracket tabs are bent over to clamp all brackets of the joint as shown in FIG. 7. The seal can also be made from closed cell neoprene or foam tape of non-combustible type.

Where ducting has side lengths of less than 450 mm it is possible to rely only upon the binding of the corner bracket tabs to effect and support the seal between the abutting duct portions. However ducts having side lengths greater than 450 mm require the use of additional connecting clamps to clamp the flanges of the ducts. Such clamps have been made the subject of at least some of the prior art specifications mentioned at the begining of this specification.

Figure 8:
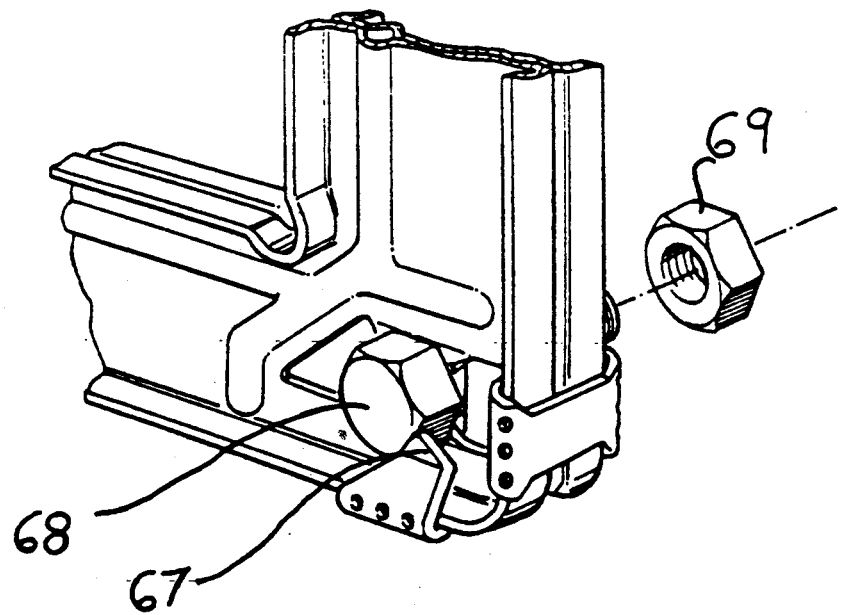

As shown in FIG. 8 the aperture exposed in the corner region 124 of the brackets by the bending of the tab 127 out to its final position (as shown in FIG. 7) is aligned with that portion of the aperture of the adjacent, abutting bracket which was vacated by the waist region of the tab of the adjacent, abutting bracket. The two abutting vacated regions, rotated 90° with respect to each other, create a generally square aperture through the bound corner brackets. This aperture can accept a bolt 68 threaded there through screw clamped by a nut 69 as illustrated in FIG. 8. As for the first embodiment this nut and bolt assembly can be used either to hold auxilliary equipment to the corner bracket, or in isolated circumstances where physical access makes tab bending difficult, the nut and bolt can be used as a substitute for the normal tab clamp arrangement of the invention.

Tests conducted on the second embodiment using butyl mastic seals and the clamp arrangement described have provided a duct joint which will provide an air seal for a pressure differential between the inside and the outside of the duct of 10 inches water gauge. A 5 inch water gauge pressure differential seal was easily achieved in the tests on the first embodiment.

The spacing between the fold lines of the tab 127 is matched to the width of the adjacent, abutting corner brackets (including allowance for the abutting dimples 53). The location of the fold line perforations closest to where the tab 127 joins the corner region 124 is selected so as to provide a close fit for the tab against the rim 129 when in the bent, clamping condition.

The above describes only some embodiments of the present invention and modifications obvious to those skilled in the art can be made thereto without departing from the scope of the present invention.

For example the brackets can be made from materials other than steel and can be applied wherever relatively large rectangular cross section duct work needs to be joined n an economical fashion. Zinc or cadmium plating can be used instead of galvanising.

The tab area can be extended longitudinally or shortened as necessary to provide differing amounts of tab overlap.

Serrations or scoring can be substituted for the holes used to facilitate bending.

The principle of the tab arrangement of the invention can be applied to any and all corner brackets presently available in the market.

What I claim is:

1. A corner bracket for mounting on each corner of an end of an air conditioning duct to be abutted and subsequently joined; said corner bracket comprising first and second coplanar longitudinal legs connected at right angles to each other, a corner region thereby being defined at the area of intersection of said first and second legs; wherein a bendable elongated tab is provided in said corner region, the tab having all sides except one detached from the bracket and the tab being bendable along the side connected to the bracket out of the plane of the bracket and over an outer edge of said corner region thereby providing a means for clamping said bracket to a second similar corner bracket and thereby forming an aperture through the corner region of the bracket, the longitudinal center line of said tab being aligned with the longitudinal center line of one of the legs.

2. The corner bracket of claim 1 wherein the side of the tab left connected is that side closest to the adjacent outer rim of said second leg and said tab is aligned with said first leg.

3. The corner bracket of claim 2 wherein said tab is waisted by having a center portion of its longitudinal extent provided with a narrower width than the end portions thereof.

4. The corner bracket of claim 2 wherein said tab is of sufficient length to allow it to be bent so as to be bent around and thereby clamp at least an adjacent edge of an abutting second corner bracket.

5. The corner bracket of claim 1, wherein the side of the tab left connected is that side closest to the adjacent outer rim of said first leg and said tab is aligned with said second leg.

6. The corner bracket of claim 5 wherein said tab is waisted by having a center portion of its longitudinal extent provided with a narrower width than the end portions thereof.

7. The corner bracket of claim 5 wherein said tab is of sufficient length to allow it to be bent so as to be bent around and thereby clamp at least an adjacent edge of an abutting second corner bracket.

8. A system for joining two like ends of air conditioning ducts of substantially rectangular cross-section, each end having four coplanar partial flange members, said system comprising eight L-shaped corner brackets arranged two for each corner of said duct, each said corner bracket comprising first and second legs which are substantially co-planar and perpendicular, a corner region being defined at an area of intersection of said legs and having an elongated bendable tab joined at one end to said bracket, and generally aligned with one of said legs; wherein each corner of the duct joint is secured by an abutting pair of said corner brackets arranged with the first leg of each bracket lying alongside the second leg of the other bracket, said bracket clamping said partial flange members and each said tab being bent out of the plane of the bracket away from the corresponding one leg and over the corner region of both brackets to maintain the clamping action and thereby forming an aperture through the corner region of the bracket.

9. An L-shaped corner bracket comprising first and second legs which are substantially co-planar and perpendicular, a corner region being defined at the intersection of said legs and having an elongated bendable tab joined at one end to said bracket and aligned with one of said legs, the tab being bendable out of the plane of the bracket and over an outer edge of said corner region thereby providing a means for clamping said bracket to a second similar corner bracket and thereby forming an aperture through the corner region of the bracket.

10. The corner bracket of claim 9 wherein said tab is waisted by having a center portion of its longitudinal extent provided with a narrower width than the end portions thereof.

11. The bracket of claim 9 wherein fold lines are defined on said tab by perforations through the tab.

12. The bracket of claim 9 wherein said legs of said bracket are flat metal strips turned at the edges so as to provide stiffening ribs.

13. The bracket of claim 12 further including elongated raised portions within the perimeter of and running the length of said strips.

14. A system of interconnecting abutting first and second corner brackets; each said bracket comprising first and second longitudinal legs, connected at a common end at right angles to each other whereby a corner region is defined at the area of the intersection of said first and second legs; said first and second legs lying in a common plane; wherein a bendable longitudinal tab is provided in said corner region, the tab having all sides except one detached from the bracket and the tab being bendable along the side connected to the bracket out of the plane of the bracket to thereby form an aperture through the corner region of the bracket, the longitudinal center line of said tab being aligned with the longitudinal center line of said first leg; said first and second brackets being aligned in abutment such that said first leg of said first bracket lies against said second leg of said second bracket whilst, at the same time, said second leg of said first bracket lies against said first leg of said second bracket; said first and second brackets being mechanically interconnected by the steps of:
(a) bending the tab of said first bracket around the immediately adjacent outer rim of said second leg of said first bracket and thence around the immediately adjacent outer rim of said first leg of said second bracket;
(b) bending the tab of said second bracket around the immediately adjacent outer rim of said second leg of said second bracket and thence around the immediately adjacent outer rim of said first leg of said first bracket.

15. The system of claim 14 wherein the legs of each bracket are flat strips turned at the edges to provide stiffening ribs, said ribs also acting to provide purchase for said tabs when said tabs are folded over said ribs.

16. The system of claim 14 wherein said system is applied to cause abutted ends of generally square or rectangular cross section duct to be connected in permanently and firmly abutted relationship,
the tabs of interconnected brackets thereby acting against not just the bracket against which they immediately abut, but also with all other abutted corner brackets thereby providing a composite, rigid duct interconnection.

17. A system of interconnecting abutting first and second corner brackets; each said bracket comprising first and second longitudinal legs connected at a common end at right angles to each other whereby a corner region is defined at the area of the intersection of said first and second legs; said first and second legs lying in a common plane; wherein a bendable longitudinal tab is provided in said corner region, the tab having all sides except one detached from the bracket and the tab being bendable along the side connected to the bracket out of the plane of the bracket to thereby form an aperture through the corner region of the bracket, the longitudinal center line of said tab being aligned with the longitudinal center line of said second leg; said first and second brackets being aligned in abutment such that said first leg of said first bracket lies against said second leg of said second bracket whilst, at the same time, said second leg of said first bracket lies against said first leg of said second bracket; said first and second brackets being mechanically interconnected by the steps of:
(a) bending the tab of said first bracket around the immediately adjacent outer rim of said first leg of said first bracket and thence around the immediately adjacent outer rim of said second leg of said second bracket;
(b) bending the tab of said second bracket around the immediately adjacent outer rim of said first leg of said second bracket and thence around the immediately adjacent outer rim of said first leg of said first bracket.

18. The system of claim 17 wherein the legs of each bracket are flat strips turned at the edges to provide stiffening ribs, said ribs also acting to provide purchase for said tabs when said tabs are folded over said ribs.

19. The system of claim 17 wherein said system is applied to cause abutted ends of generally square or rectangular cross section duct to be connected in permanently and firmly abutted relationship,
the tabs of interconnected brackets thereby acting against not just the bracket against which they immediately abut, but also with all other abutted corner brackets thereby providing a composite, rigid duct interconnection.

* * * * *